(12) United States Patent
Fujiwara

(10) Patent No.: US 6,670,048 B2
(45) Date of Patent: Dec. 30, 2003

(54) SINTERED SPROCKET

(75) Inventor: Akira Fujiwara, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/130,287

(22) PCT Filed: Jun. 19, 2001

(86) PCT No.: PCT/JP01/05210
§ 371 (c)(1),
(2), (4) Date: May 29, 2002

(87) PCT Pub. No.: WO02/34957
PCT Pub. Date: May 2, 2002

(65) Prior Publication Data
US 2003/0061904 A1 Apr. 3, 2003

(30) Foreign Application Priority Data
Oct. 25, 2000 (JP) .......................................... 2000-326149

(51) Int. Cl.⁷ .............................. B22F 5/08; B22F 3/24
(52) U.S. Cl. .................... 428/548; 29/893.37; 148/902; 419/1; 419/26; 419/28; 419/29; 428/551; 428/582; 428/682; 428/683; 428/688

(58) Field of Search ................................ 428/548, 551, 428/582, 682, 683, 688; 29/893.37; 419/1, 26, 28, 29; 148/206, 225, 902

(56) References Cited

U.S. PATENT DOCUMENTS
6,264,886 B1 * 7/2001 Mizuta et al. ................ 419/26

FOREIGN PATENT DOCUMENTS
JP         09-157806         6/1997

OTHER PUBLICATIONS
International Search Report for PCT/JP01/05210, Sep. 6, 2001.

* cited by examiner

Primary Examiner—Robert R. Koehler
(74) Attorney, Agent, or Firm—Arent Fox Kintner Plotkin & Kahn, PLLC

(57) ABSTRACT

A sintered sprocket is provided in which surface pressure resistance can be improved without using a forging processing. An Fe-based sintered alloy which contains C at 0.2 to 0.5% by weight, Mo at 0.2 to 1.0% by weight, and Ni at 0.2 to 1.0% by weight, and which exhibits a metallic structure in which an internal base layer comprises ferrite and bainite and in which the ferrite adjoins voids, is subjected to a rolling and is then subjected to carburizing and hardening.

8 Claims, 5 Drawing Sheets

SINTERED SPROCKET

CROSS-REFERENCE TO RELATED APPLICATION

This application is a National Stage entry of International Application No. PCT/JP 01/05210, filed Jun. 19, 2001, the entire specification claims and drawings of which are incorporated herewith by reference.

BACKGROUND OF THE INVENTION

The present invention relates to a sintered sprocket which for example, is suitable as a sprocket for a cam shaft timing chain for an automobile, etc., and relates to a production method therefor.

As a sprocket as described above, for example, a sprocket which is compacted in the approximate shape of a sprocket by forging, which is finished by machining, and which is then subjected to carburizing and hardening, is known. In such a sprocket, although the precision of tooth surfaces and the surface pressure resistance are superior, there is a problem in that production costs are relatively high due to the forging processing which is carried out. In addition, an inexpensive sprocket which is punched from a plate material by pressing and is subjected to carburizing and hardening, is also known. In such a sprocket, although the surface pressure resistance is sufficient, there are problems in that the production costs are hardly decreased since a machining processing is needed for press fractures, and in addition, in that the precision of the tooth surfaces is lower due to warping caused by the press processing. Furthermore, a sprocket which is subjected to carburizing and hardening after a sintered material was subjected to a sizing processing, is also known. In such a sprocket, although the precision of the tooth surfaces and the production costs are advantageous, there is a problem in that the surface pressure resistance is inferior.

As described above, conventional sprockets have both advantages and disadvantages, respectively, and a sprocket in which all of the surface pressure resistance, the precision of the tooth surfaces, and the production costs are superior has been desired.

In the case in which a sprocket is produced from a sintered material, although there is a problem in the surface pressure resistance as described above, the surface resistance is reduced by voids which inevitably exist inside the material. Therefore, in order to improve the surface pressure resistance, increase in the density is considered, and the following methods are contemplated for that purpose. First, a green compact is presintered and is subjected to a sizing. Next, this presintered material is compacted by pressing, and it is sintered and subjected to a sizing. Then, these press-compactings and sizings are carried out two times, and the density of the sprocket can be thereby increased. However, the increase of the density is limited even in such a production method having many processes, and the surface pressure resistance of the tooth surface was insufficient. In addition, although the density is increased by carrying out forging on a sintered material and the surface pressure resistance is thereby improved, there is the same problem as in the above in that the production costs are relatively high.

SUMMARY OF INVENTION

It is an object of the present invention to provide a sintered sprocket which can improve the surface pressure resistance without an expensive forging processing, and to provide a production method therefor.

A sintered sprocket of the present invention consists of an Fe-based sintered alloy containing C at 0.2 to 0.5% by weight, Mo at 0.2 to 1.0% by weight, and Ni at 0.2 to 1.0% by weight, and exhibits a metallic structure in which an internal base layer comprises ferrite and bainite and in which the ferrite adjoins voids.

In the sintered sprocket as constructed above, since the ferrite adjoins the voids, the ferrite is plastically deformed and the voids which are located inside the tooth surface are collapsed by carrying out a deformation processing, such as a rolling, on the tooth surface. As a result, volumes of the voids are reduced, and the density in the vicinity of the tooth surface is increased. The surface pressure resistance can be thereby improved while maintaining a high-precision tooth surface and the production costs are lower by using powder metallurgy techniques. In addition, since the internal base layer contains bainite, the strength and the hardness of the matrix is increased.

The above component composition is indispensable in order to obtain the metallic composition as described above. In the following explanation, "%" refers as "% by weight".

C: 0.2 to 0.5%

In the case in which the C content is below 0.2%, the strength and the hardness of the matrix are insufficient, since bainite is hardly formed. In contrast, in the case in which the C content exceeds 0.5%, the density is insufficiently increased when a deformation processing is carried out on the tooth surface, since the ferrite content is insufficient. Viewed in this light, it is desirable that the ferrite in the base layer be 40% or more by area.

Mo, Ni: 0.2 to 1.0%

Ni and Mo contribute to generation of bainite by strengthening the matrix in the base layer and by improving the hardening property. In the case in which the Ni content and the Mo content are below 0.2%, respectively, the above effects are insufficient. In contrast, in the case in which the Ni content and the Mo content exceed 1.0%, martensite is easily deposited and the strength is lowered. The present invention may include the case in which the martensite coexists with the bainite.

It is desirable that the ferrite in the base layer be 40% or more by area, the density after rolling is thereby further increased, and the surface pressure resistance can be improved. In addition, it is desirable that a carbide layer be provided at the frontmost location which is outside of the base layer, and the surface pressure resistance can be thereby improved. The carbide layer can be formed by a carburizing processing.

Next, the production method for the sintered sprocket of the present invention comprises rolling an Fe-based sintered alloy, and carburizing and hardening the Fe-based sintered alloy, wherein the Fe-based sintered alloy contains C at 0.2 to 0.5% by weight, Mo at 0.2 to 1.0% by weight, and Ni at 0.2 to 1.0% by weight and exhibits a metallic structure in which an internal base layer comprises ferrite and bainite and in which the ferrite adjoins voids.

DETAILED DESCRIPTION OF THE PREFERRED EMBODIMENTS

Figure 1A:
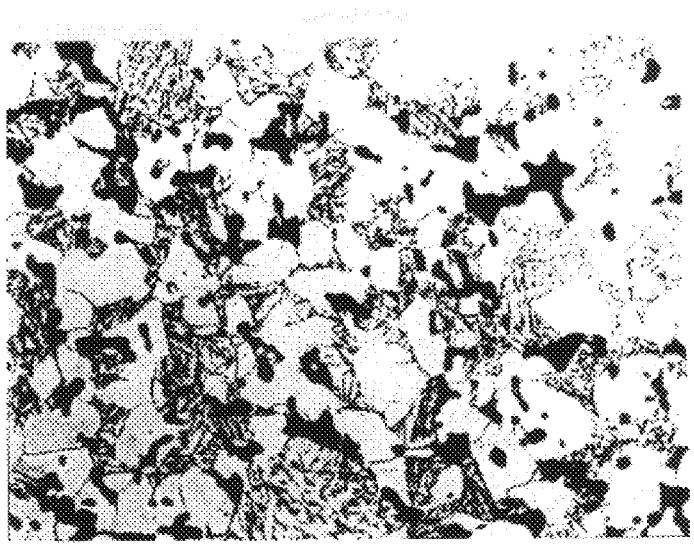
FIGS. 1A and 1B show photographs of a metallic structure of a sintered sprocket according to the present invention.
Figure 1B:
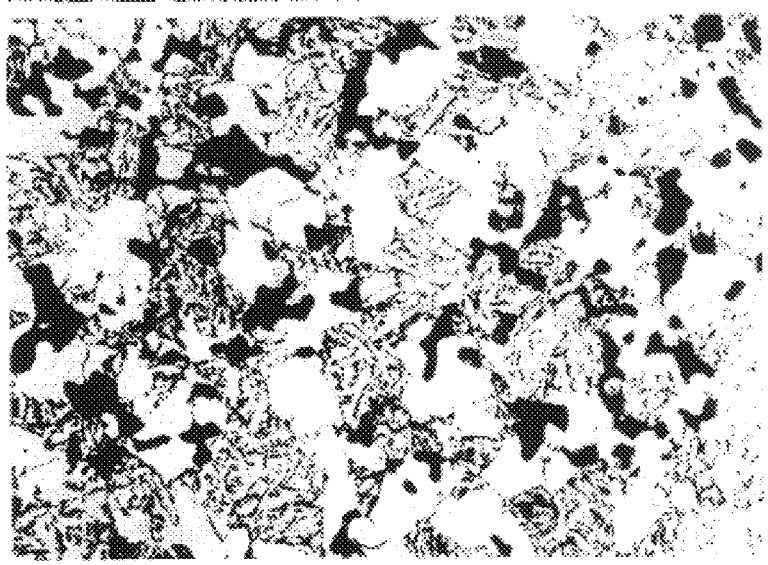
Figure 1C:
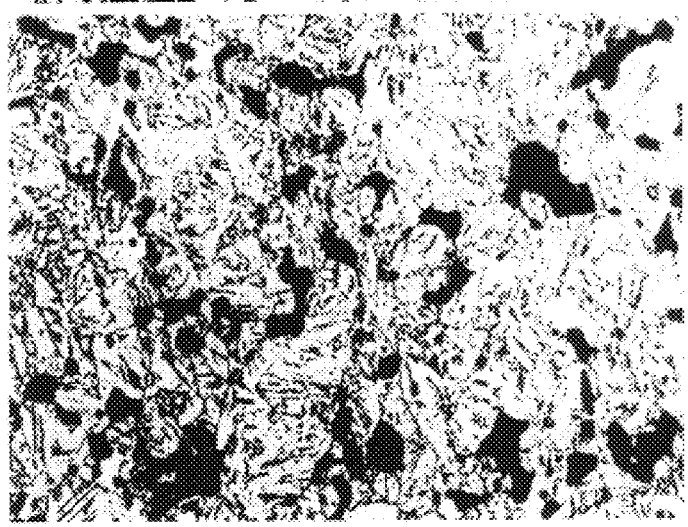
FIG. 1C shows a photograph of a metallic structure of a conventional sintered sprocket.

FIGS. 1A, 1B, and 1C show photographs of a metallic structure after sintering of a base layer in a sintered sprocket. As shown in FIGS. 1A and 1B, in the case in which the C content is 0.3% by weight or 0.4% by weight, ferrite (white portions in the figures) adjoins voids (black portions in the figures). In addition, bainite (portions in which fine lines are crossed in the figures) exists in the base layer. As shown in FIG. 1C, in the case in which the C content is 0.6% by weight, the bainite is increased and the ferrite is decreased. The reasons the metallic structures of FIGS. 1A and 1B are formed are supposed to be as follows.

That is, in the case in which a compact is sintered, the carbon concentration in iron powder which is adjoined to graphite powder is locally increased, and the melting point of the iron powder is thereby lowered. Thus, the iron powder is first melted and infiltrated between particles thereof with the graphite powder, and a void is formed at a position in which the graphite particle existed. Carbon is diffused into the iron (ferrite) powder at a portion at which the graphite powder infiltrated, the carbon content thereof is increased, and bainite is thereby deposited after cooling. It is supposed that the iron powder or a part thereof, which was initially adjoined to the graphite powder, remains as ferrite without diffusing of carbon. However, this is merely a hypothesis, and the present invention is not limited by whether or not such an action occurs.

In the production method for the sintered sprocket as described above, the ferrite plastically deforms by the rolling, the voids are thereby collapsed, and the density of the sprocket is increased. Diffusion of iron atoms occurs by carburizing and hardening, and the voids are further reduced. Therefore, the density of the surface of the sintered sprocket is increased, and the surface pressure resistance can be further improved. As a carburizing and hardening, high concentration carburizing carried out in a CO concentration of 0.1% or more by weight is preferable, and the surface pressure resistance can be thereby further improved.

Figure 2A:
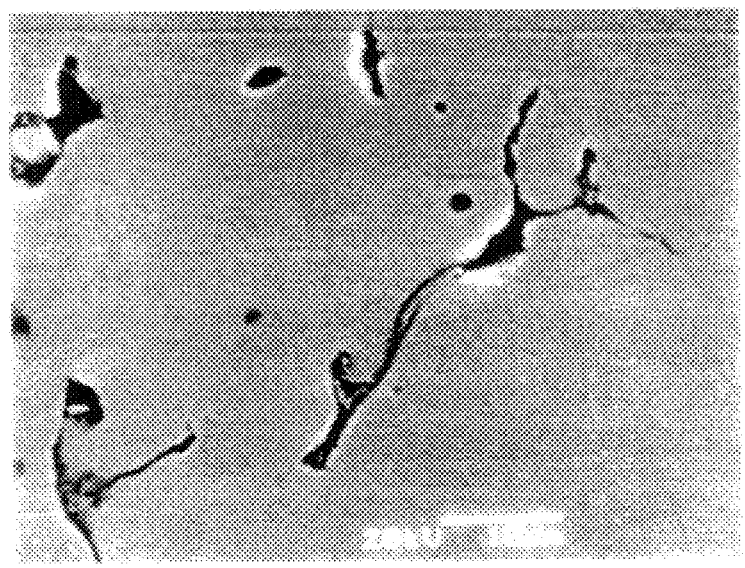
FIG. 2A shows a photograph of a metallic structure of a sintered sprocket after a rolling.
Figure 2B:
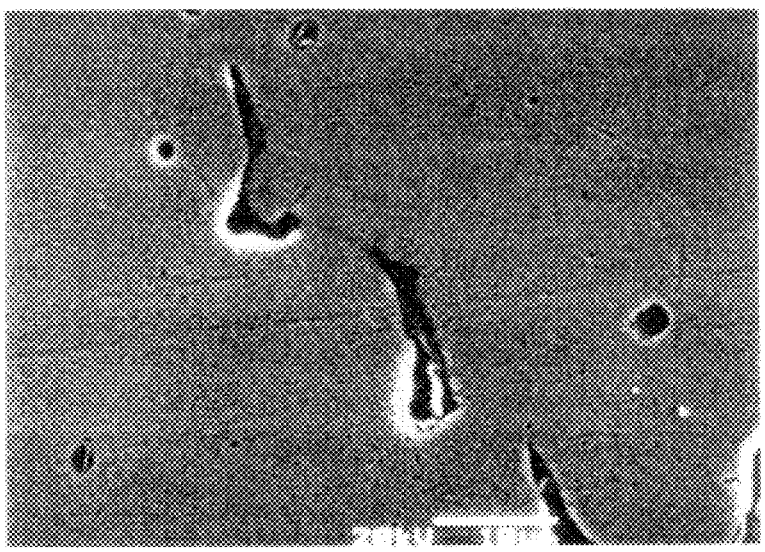
FIG. 2B shows a photograph of a metallic structure of a sintered sprocket after a carburizing and hardening.
Figure 2C:
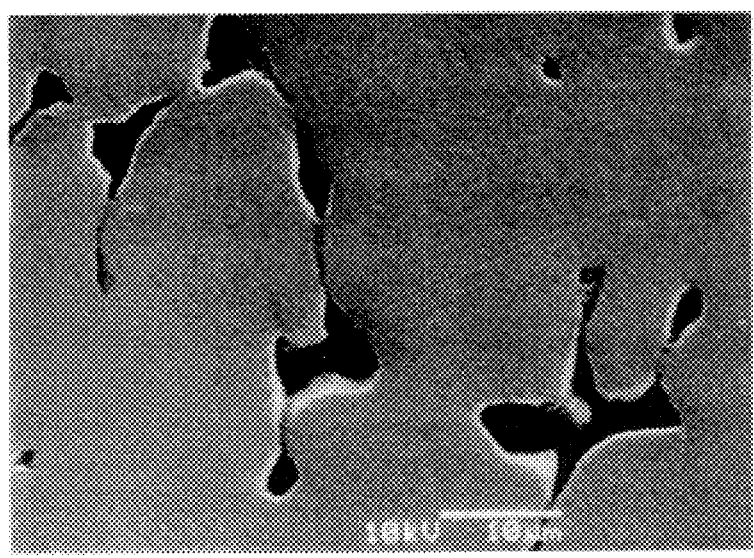
FIG. 2C shows a photograph of a metallic structure of a sintered sprocket after a resintering.

FIG. 2A shows a photograph of a metallic structure of a sprocket after rolling, and a condition in which voids are collapsed is well evidenced. FIG. 2B shows a photograph of a metallic structure of a sprocket carburized and hardened at 900° C. after rolling, and it is demonstrated that the central part of a narrow void is almost completely closed by the carburizing and hardening, in comparison with the metallic structure in FIG. 2A. FIG. 2C shows a photograph of a metallic structure of a sprocket resintered at 1130° C. instead of the carburizing and hardening. This processing is equivalent to the carburizing and hardening, and it is demonstrated that the central part of a narrow void is almost completely closed in the same way as in FIG. 2B. Therefore, it is demonstrated that substantial fine structure is formed by the carburizing and hardening in which the temperature thereof is lower than that of resintering.

In the production method for the sintered sprocket of the present invention, it is desirable that the ferrite on the base layer be 40% or more by area. In addition, it is desirable that the rolling width be 0.09 to 0.15 mm, and the density of the surface can thereby be maximally increased.

EXAMPLES

In the following, the present invention will be explained in detail by referring to examples according to the present invention.

Figure 3:
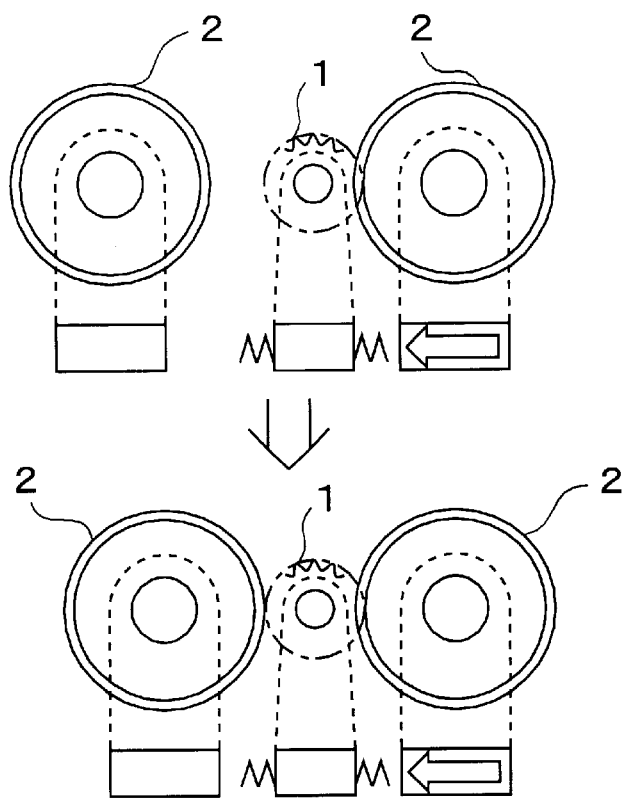
FIG. 3 shows a sectional view of a rolling apparatus.

Powder consisting of Ni powder at 0.5% by volume, Mo powder at 0.5% by volume, graphite powder at 0.3 to 0.6% by volume, and iron powder as the balance, was compacted in a sprocket shape and was then sintered in air at 1150±20° C. for 60 minutes. Next, the sprocket was rolled to a rolling width of 0.09 mm, using a rolling apparatus shown in FIG. 3. In the figures, reference numeral 1 indicates a sprocket, and reference numerals 2 indicate dies. Gear teeth to be equal to those of the sprocket 1 were formed at a periphery of the die 2A. Tooth surfaces of the sprocket were pressed by sandwiching the sprocket 1 between two dies 2 and rotating the dies 2, and the gear teeth were thereby compacted in a specific tooth shape. The term "rolling width" refers to a pressing amount in a perpendicular direction to the tooth surface of the sprocket. With respect to each sprocket, graphite addition amount (% by volume), carbon content (% by weight), compacting density, surface hardness, matrix hardness, and ferrite area ratio, are shown in Table 1. In addition, the density of each sprocket after rolling was measured at various distances from the surface thereof. The results thereof are shown in Table 2 and FIG. 4.

TABLE 1

| Graphite Addition Amount | Density | Apparent Hardness | Base Material Hardness HV 0.1 | | | Ferrite Area Ratio | Carbon Content |
|---|---|---|---|---|---|---|---|
| % by volume | g/cm³ | HRB | Average | Min | max | % | % by weight |
| 0.3 | 7.05 | 51 | 151 | 139 | 172 | 50 | 0.23 |
| 0.4 | 7.04 | 58 | 197 | 164 | 229 | 39 | 0.32 |
| 0.5 | 7.06 | 71 | 204 | 179 | 223 | 20 | 0.41 |
| 0.6 | 7.07 | 74 | 218 | 208 | 228 | 17 | 0.48 |

TABLE 2

| Graphite Addition Amount | Density | Density After Rolling | | |
|---|---|---|---|---|
| % by volume | 0.2 | 0.4 | 0.6 | 0.8 |
| 0.3 | 7.65 | 7.52 | 7.29 | |
| 0.4 | 7.42 | 7.36 | 7.12 | 7.06 |
| 0.5 | 7.21 | 7.2 | 7.1 | 7.05 |
| 0.6 | 7.21 | 7.16 | 7.03 | 7.03 |

Figure 4:
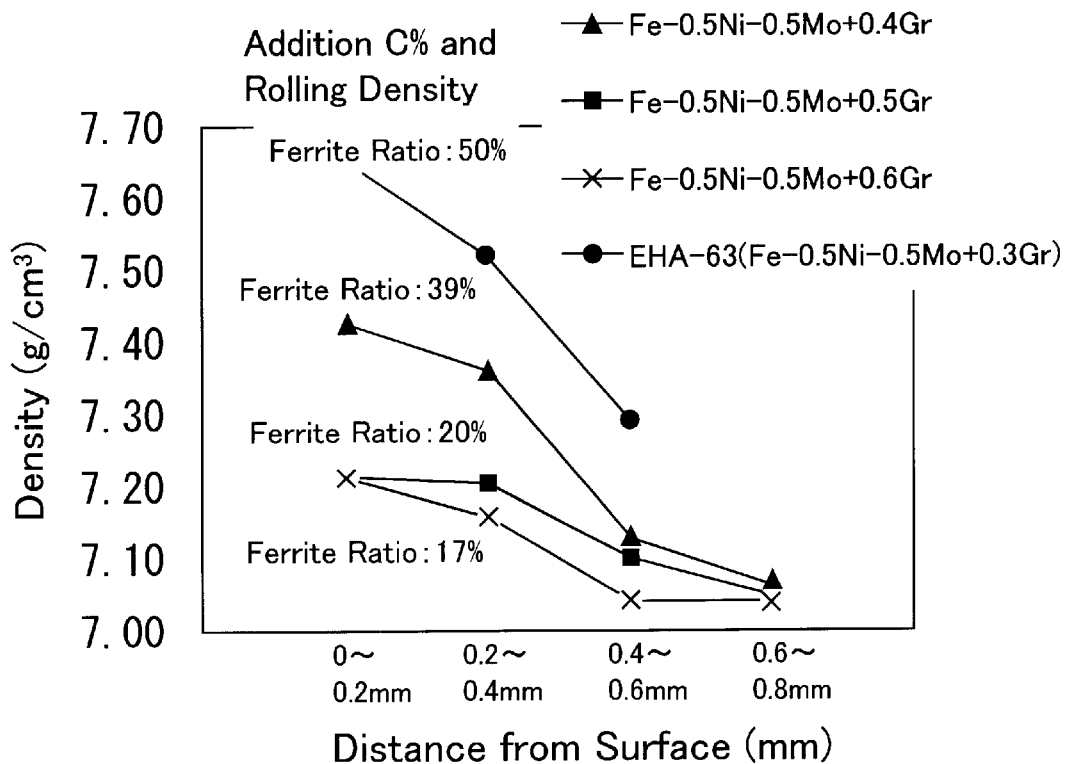
FIG. 4 shows the relationships between the distance from the surface and the density with respect to a sprocket of the present invention.
Figure 5:
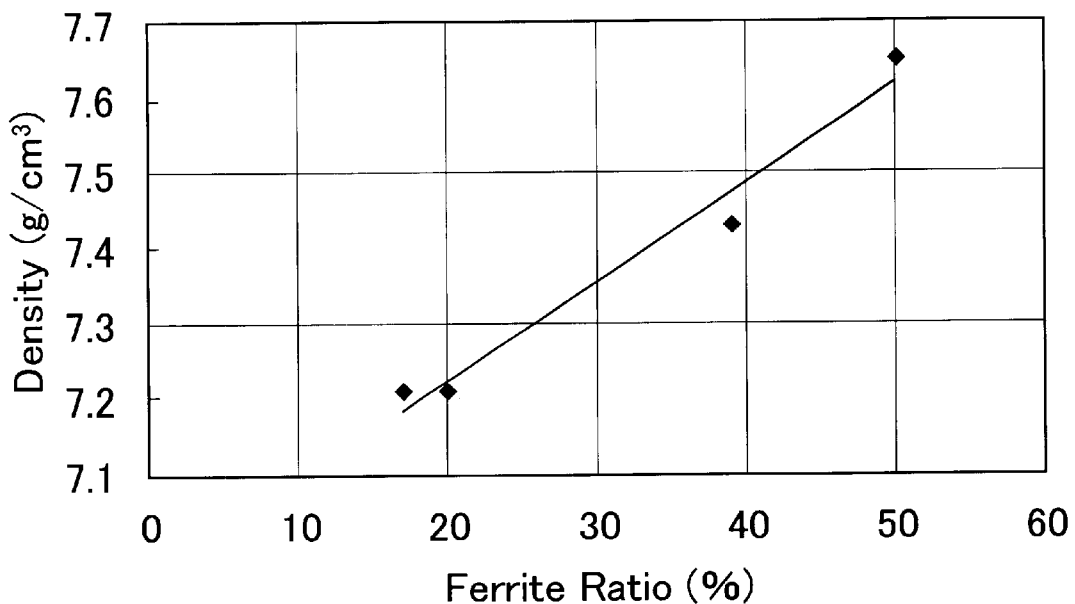
FIG. 5 shows the relationships between the ferrite ratio and the density with respect to a sprocket of the present invention.

As is apparent from FIG. 4, the density after rolling is increased by increasing the ferrite area ratio (ferrite ratio), since the density is increased by the rolling. This increasing occurs by plastically deforming ferrite which adjoins voids and by collapsing the voids. FIG. 5 shows the relationship between the ferrite ratio and the density at a depth of 0.2 mm from the surface. As is apparent from this FIG. 5, in the case in which the ferrite ratio is 40% or more by weight, the surface has a density of 7.5 g/cm³ or more.

Figure 6:
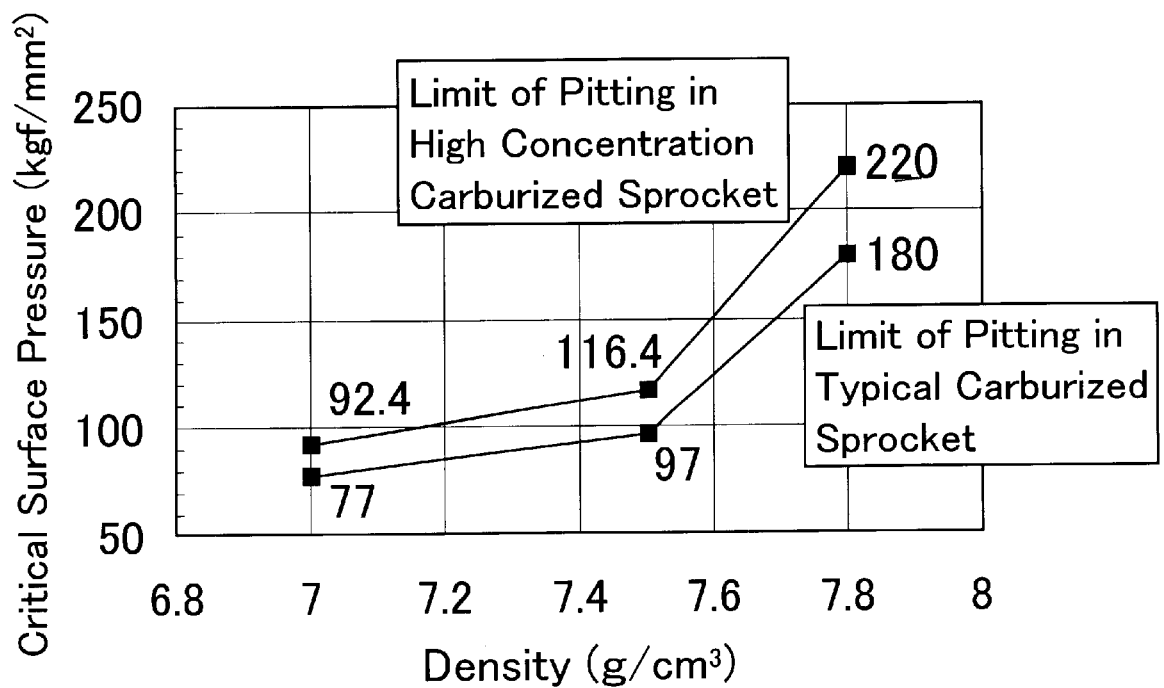
FIG. 6 shows the relationships between the critical surface pressure and the density with respect to a sprocket of the present invention.

Subsequently, the above sprocket was subjected to carburizing and hardening. The carburizing and hardening were carried out under two conditions of a typical carburizing in which the sprocket is held in an atmosphere of 0.8% CO concentration at 900° C. for 60 minutes, and a high concentration carburizing in which the sprocket is held in an atmosphere of 1.2% CO concentration at 900° C. for 60 minutes. Next, the relationship between the density and the critical surface pressure of each sprocket was researched and the results thereof are shown in FIG. 6. The term "critical surface pressure" refers to a value calculated by substituting pressure, at which the specific deformation occurs in the tooth surface of the sprocket, in the Hertzian equation, and refers to a surface pressure at which fatigue fracture such as pitting or buckling occurs. That is, in the case in which the sprocket is used at the critical surface pressure, pitting or buckling occurs. Therefore, the higher the critical surface pressure, the greater the surface pressure resistance. The term "pitting" refers to fatigue fracture in which the tooth surface of the sprocket peels, and the term "buckling" refers to fatigue fracture in which the tooth surface sinks. As shown in FIG. 6, the critical surface pressure is increased by increasing the density of the sprocket. In addition, as shown in FIG. 6, in the case in which the density exceeds 7.5 g/cm³, the critical surface pressure is remarkably increased. In particular, since the maximum density is 7.8 g/cm³ in the sprocket of the present example, in a sprocket subjected to the usual carburizing and hardening, the critical surface pressure reaches 180 kgf/mm², and in a sprocket subjected to the high concentration carburizing and hardening, the critical surface pressure reaches 220 kgf/mm².

Figure 7:
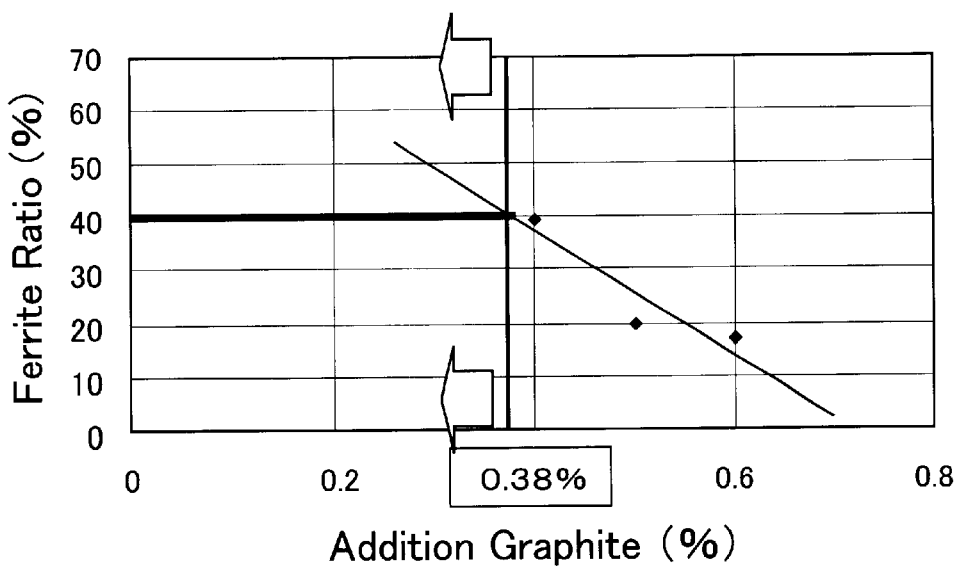
FIG. 7 shows the relationships between the additional amount of graphite and the ferrite ratio with respect to a sprocket of the present invention.

As described above, in the case in which the ferrite ratio is 40% or more by weight, the density is increased to be 7.5 g/cm³ or more, and the critical surface pressure is drastically increased. The relationship between the graphite addition amount and the ferrite ratio is shown in FIG. 7. As shown in FIG. 7, in the case in which the graphite addition amount is 0.38% by volume, the ferrite ratio is 40% or more by weight. Therefore, the graphite addition amount is preferably 0.38% or less by volume, and more preferably 0.3% or less by volume. As a result, the ferrite ratio can be increased to be 50% or more by weight.

Figure 8:
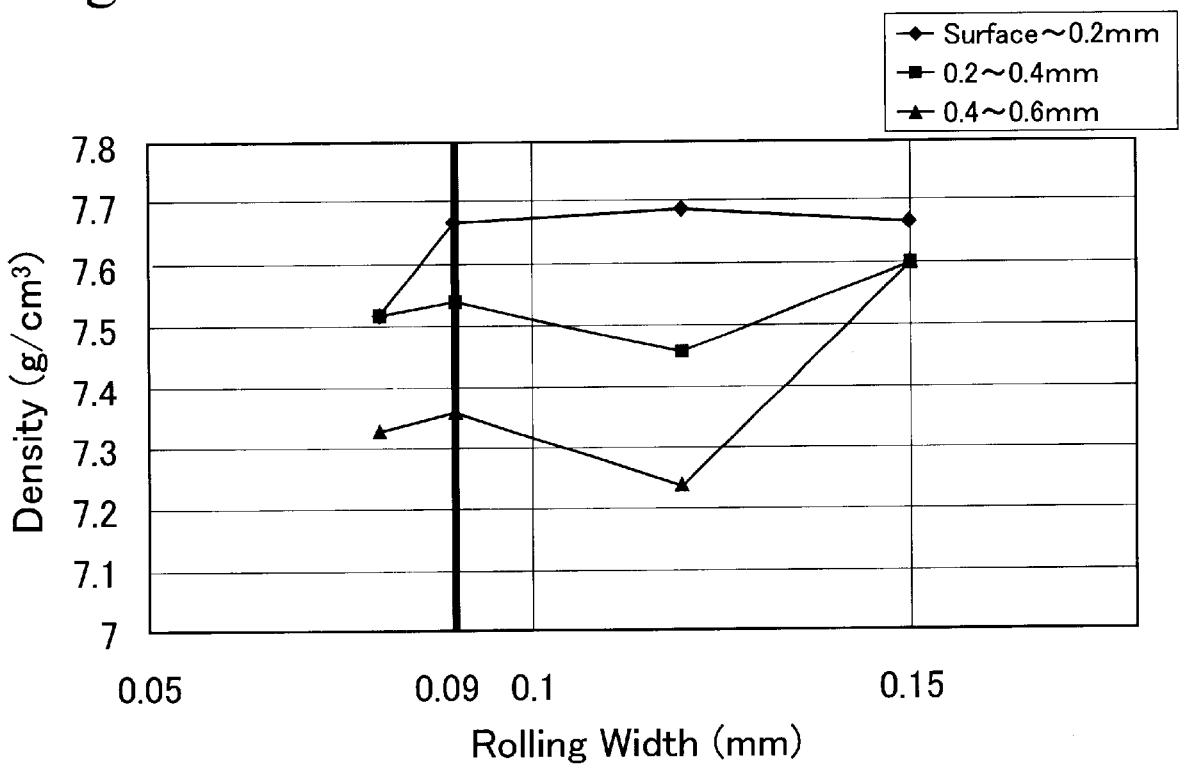
FIG. 8 shows the relationships between the rolling width and the density with respect to a sprocket of the present invention.

Next, FIG. 8 shows the relationships between the rolling width and the density of the sprocket. As shown in FIG. 8, the surface density of the sprocket becomes maximal, in the case in which the rolling width is 0.09 to 0.15 mm. It is confirmed that the density is increased no further even if the rolling width exceeds 0.15 mm, and that the life of the sprocket is decreased since load on the dies is high.

What is claimed is:

1. A sintered sprocket consisting of an Fe-based sintered alloy containing C at 0.2 to 0.5% by weight, Mo at 0.2 to 1.0% by weight, and Ni at 0.2 to 1.0% by weight, and exhibiting a metallic structure in which an internal base layer comprises ferrite and bainite and in which said ferrite adjoins voids.

2. A sintered sprocket in accordance with claim 1, wherein ferrite of said base layer is 40% or more by area.

3. A sintered sprocket in accordance with claim 1, further comprising a carbonate layer at a frontmost surface which is located outside said base layer.

4. A sintered sprocket in accordance with claim 2, further comprising a carbonate layer at a frontmost surface which is located outside said base layer.

5. A production method for a sintered sprocket comprising:

rolling an Fe-based sintered alloy, and carburizing and hardening said Fe-based sintered alloy, wherein said Fe-based sintered alloy contains C at 0.2 to 0.5% by weight, Mo at 0.2 to 1.0% by weight, and Ni at 0.2 to 1.0% by weight, and exhibits a metallic structure in which an internal base layer comprises ferrite and bainite and in which said ferrite adjoins voids.

6. A production method for a sintered sprocket in accordance with claim 5, wherein ferrite of said base layer is 40% or more by area.

7. A production method for a sintered sprocket in accordance with claim 5, wherein a rolling width of said rolling is 0.09 to 0.15 mm.

8. A production method for a sintered sprocket in accordance with claim 6, wherein a rolling width of said rolling is 0.09 to 0.15 mm.

* * * * *